(12) United States Patent
Yazdi

(10) Patent No.: US 8,487,508 B2
(45) Date of Patent: *Jul. 16, 2013

(54) METHOD AND SYSTEM FOR MONITORING ENVIRONMENTAL CONDITIONS WHILE IGNORING IRRELEVANT RANGES

(75) Inventor: Navid Yazdi, Ann Arbor, MI (US)

(73) Assignee: Evigia Systems, Inc., Ann Arbor, MI (US)

( * ) Notice: Subject to any disclaimer, the term of this patent is extended or adjusted under 35 U.S.C. 154(b) by 744 days.

This patent is subject to a terminal disclaimer.

(21) Appl. No.: 12/575,774

(22) Filed: Oct. 8, 2009

(65) Prior Publication Data

US 2010/0040113 A1 Feb. 18, 2010

Related U.S. Application Data

(62) Division of application No. 11/383,200, filed on May 13, 2006, now Pat. No. 7,619,346.

(60) Provisional application No. 60/680,718, filed on May 13, 2005.

(51) Int. Cl.
*H01L 41/00* (2006.01)
*H02N 2/00* (2006.01)
*H01H 61/00* (2006.01)
*H01H 71/16* (2006.01)

(52) U.S. Cl.
USPC ............ 310/307; 310/306; 310/332; 337/36; 337/70

(58) Field of Classification Search
USPC ................. 310/307, 332, 306; 337/36, 70
See application file for complete search history.

(56) References Cited

U.S. PATENT DOCUMENTS 7,239,064 B1 * 7/2007 Jenkins et al. ............... 310/307
7,619,346 B2 * 11/2009 Yazdi ............................ 310/307

* cited by examiner

*Primary Examiner* — Daniel Wu
*Assistant Examiner* — John Bamert
(74) *Attorney, Agent, or Firm* — Hartman Global IP Law; Gary M. Hartman; Domenica N. S. Hartman

(57) ABSTRACT

A sensing system, sensing method, and method of producing a sensing system capable of providing a cumulative measurement capability, such as in the form of a RFID tag capable of measuring cumulative heat and humidity for continuous monitoring of storage and shipping conditions of various goods. The system includes integrated circuitry and a plurality of sensing elements, preferably having cantilevered bimorph beams. Each sensing element is responsive to an environmental condition so as to deflect toward and away from open contacts in response to changes in the environmental condition. Each sensing element produces a digital output when it contacts and closes its open contacts. The integrated circuitry interfaces with the sensing elements so that the digital outputs of the sensing elements are processed to generate a system output of the sensing system.

17 Claims, 12 Drawing Sheets

FIG. 6
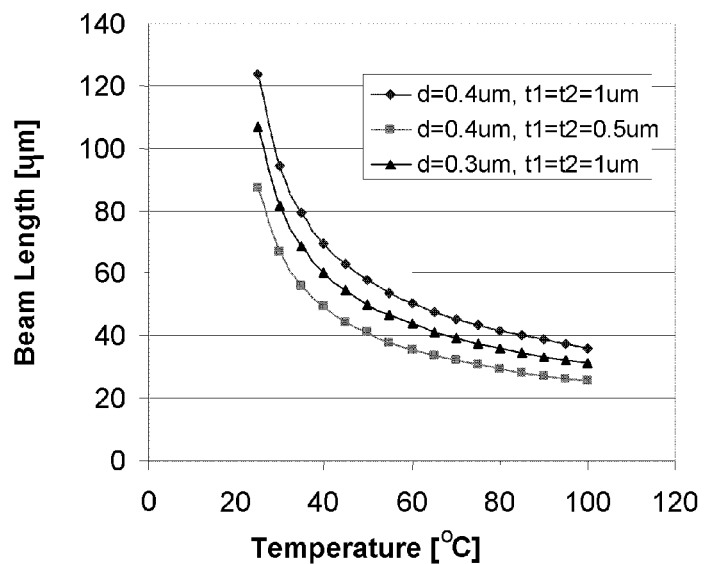
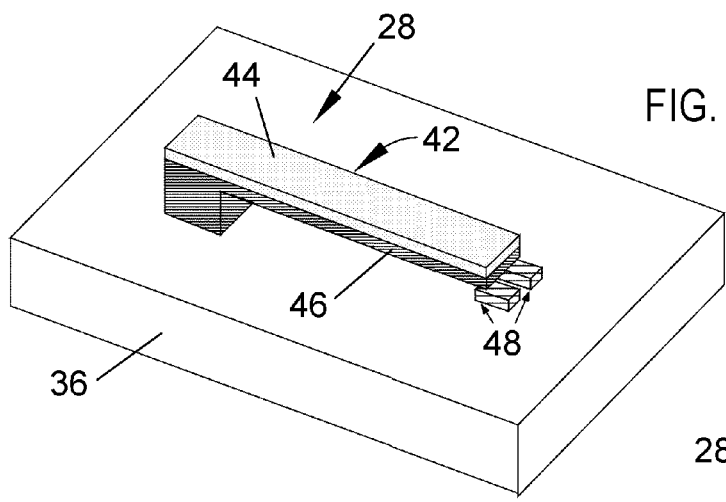
FIG. 7
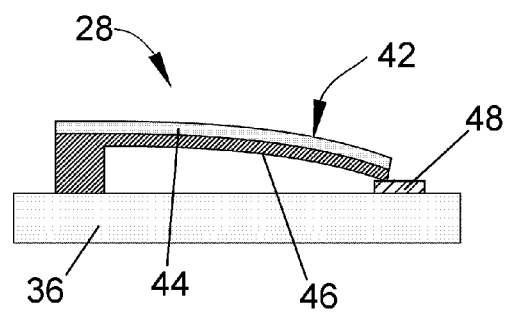
FIG. 8

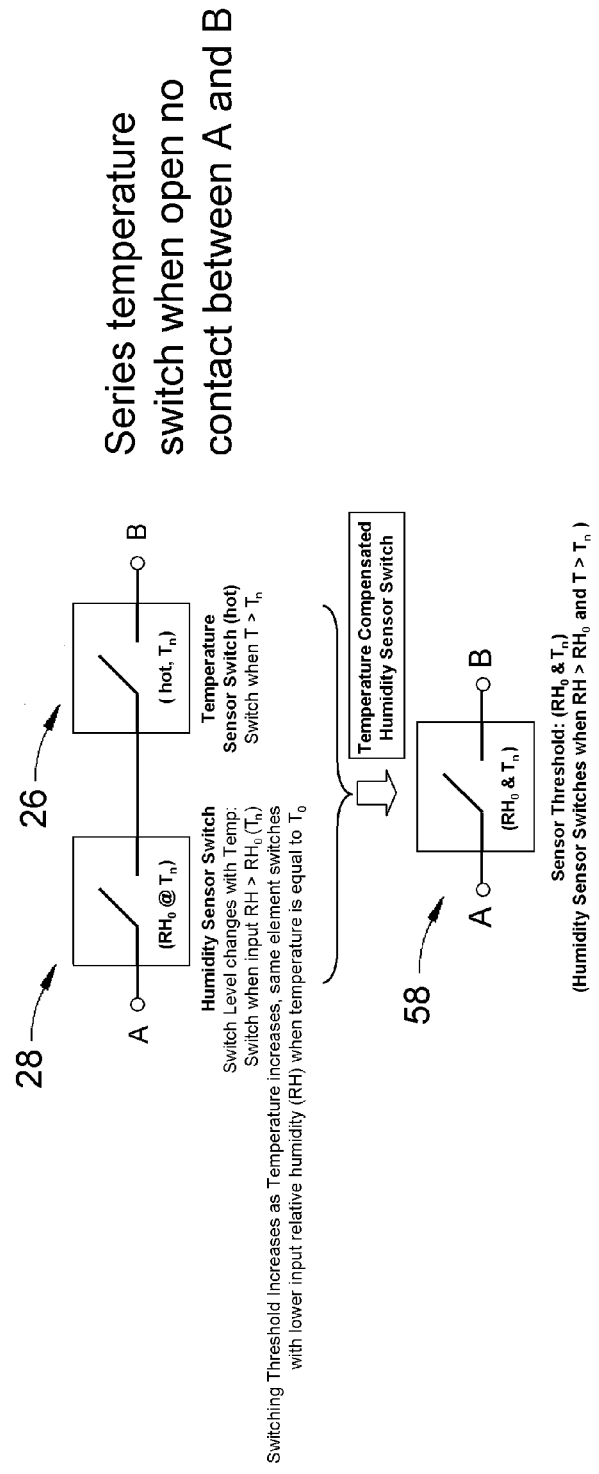

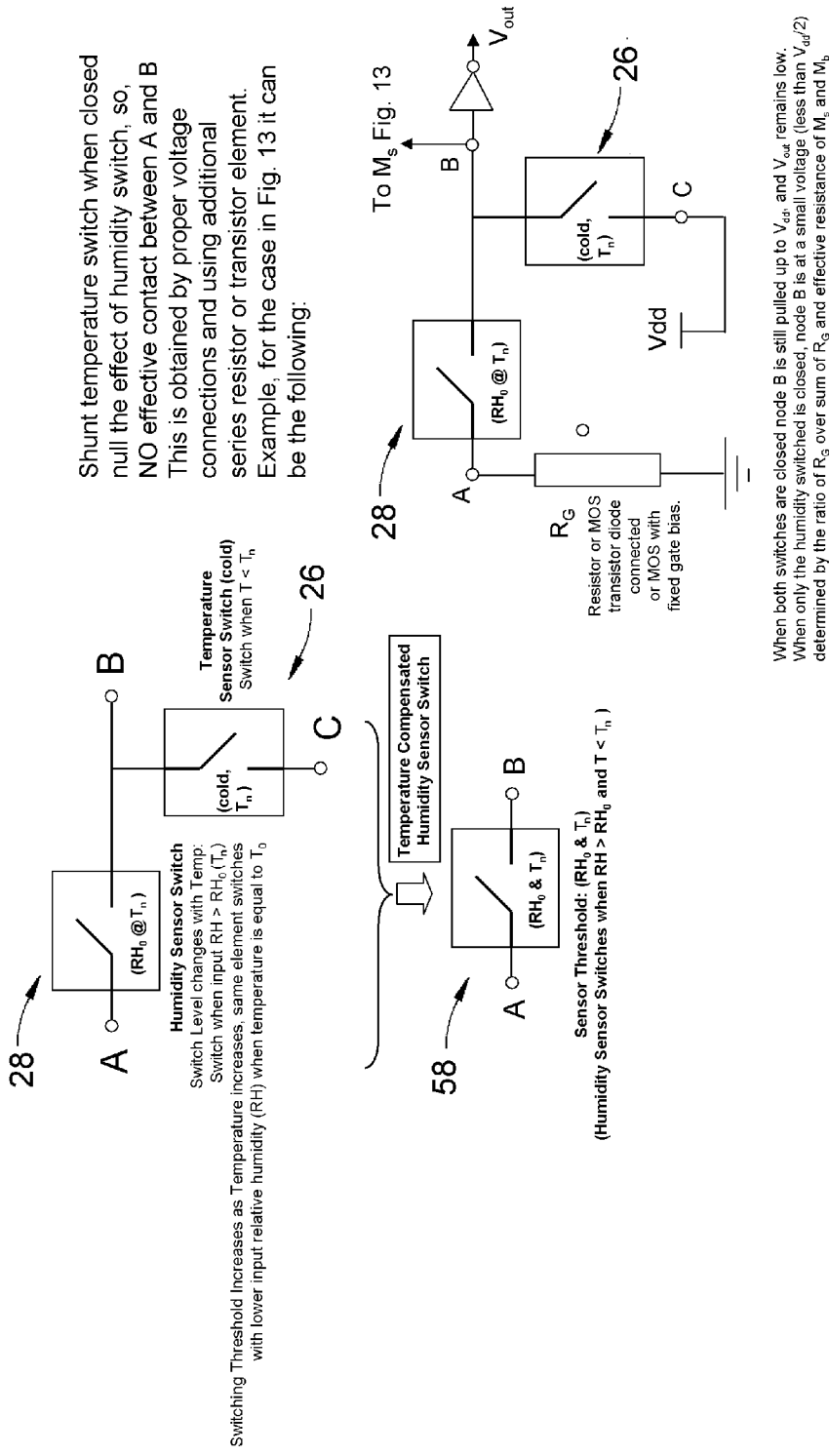

FIG. 10E

Case 2: CTE of layer 44 > CTE of 46

Result: Humidity sensor element sensitivity increases (humidity switch threshold decreases) as temperature increases Compensation for the case that temperature decreases from the nominal (room) temperature ($T_n < T_0$) (example: case not shown in any figures – coverage provided by text in description and claims.)

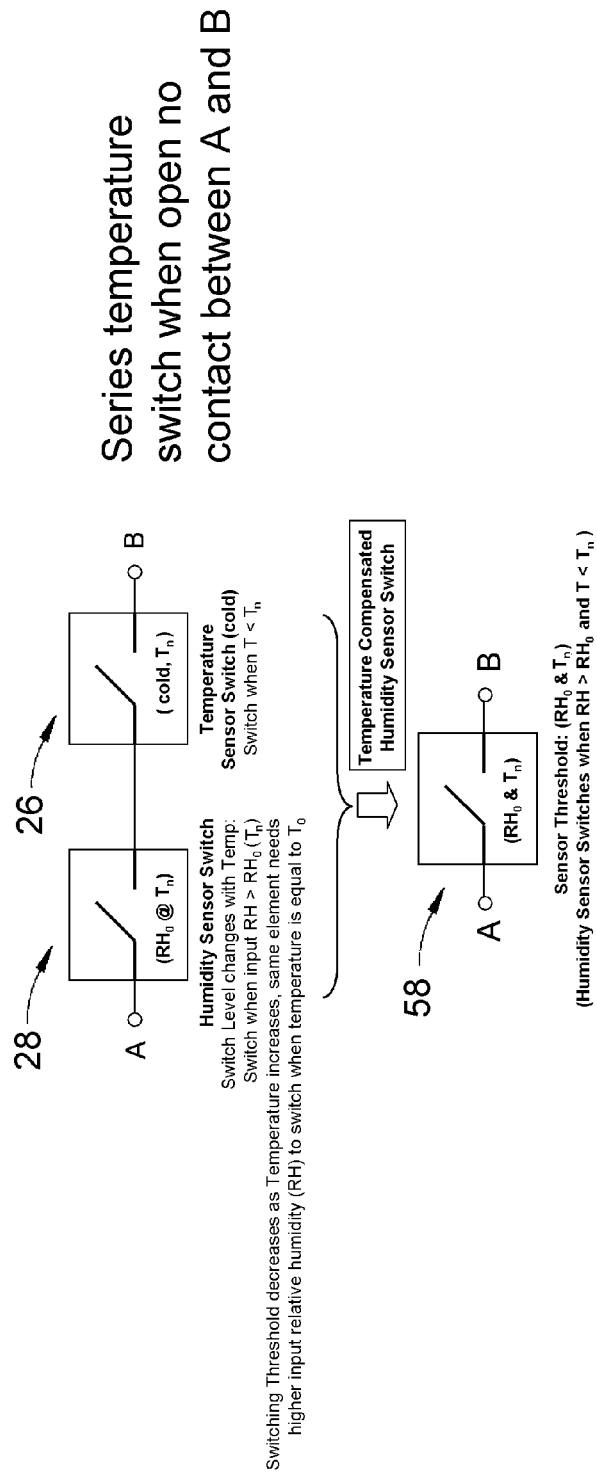

Switching Threshold decreases as Temperature increases, same element needs higher input relative humidity (RH) to switch when temperature is equal to $T_0$

METHOD AND SYSTEM FOR MONITORING ENVIRONMENTAL CONDITIONS WHILE IGNORING IRRELEVANT RANGES

CROSS REFERENCE TO RELATED APPLICATIONS

This is a division patent application of co-pending U.S. patent application Ser. No. 11/383,200, filed May 13, 2006, which claims the benefit of U.S. Provisional Application No. 60/680,718, filed May 13, 2005, the contents of which are incorporated herein by reference.

BACKGROUND OF THE INVENTION

The present invention generally relates to methods and devices capable of monitoring environmental conditions, such as heat and/or humidity, including cumulative monitoring of heat and humidity. More particularly, this invention relates to a sensor in the form of a radio frequency identification (RFID) tag capable of measuring cumulative heat and humidity for continuous monitoring of storage and shipping conditions of items in various applications, including supply-chain management of perishable goods, pharmaceuticals, chemicals, and fresh agriculture products. The sensor RFID tag lends itself to automation and cost-effective supply chain management by using an RFID wireless link for transmission of cumulative sensor data to an RFID-reader (interrogator).

Environmental conditions, particularly accumulated exposure of an item to heat and humidity over time, have a conspicuous effect on the lifetime and operational capabilities of a wide variety of goods and products, notable examples of which include perishable consumer and healthcare goods such as food, medicine, vaccines, and blood bags, and military ordnance such as explosives, propellants, and solid rocket fuel. In both commercial and military applications, assuring functionality and/or the absence of deterioration, spoilage, etc., is extremely crucial, since otherwise lives could be at risk and substantial economic losses could incur. This sensitive need requires controlled shipping and storage environments in conjunction with assigning conservative expiration dates. However, the functionality and state of goods and products cannot be ensured without continuously monitoring environmental conditions, particularly heat and humidity, and the cumulative effects thereof.

Existing temperature and humidity sensors can be primarily categorized in two groups. A first of these is sensors based on change of color of a label in response to humidity and temperature. These sensor labels are relatively inexpensive and do not require a battery for power. However, significant shortcomings include being typically limited to indicating or recording only maximum (or minimum) temperature or humidity levels. Furthermore, while sensor labels provide an easily observable visual output, they lack an electronic interface and thus are difficult to deploy in automated supply chain management networks.

The second group of existing temperature and humidity sensors can be generally categorized as environmental parameter data logger modules that include individual humidity and temperature sensors, electronic chipsets for sensor interfacing and digitizing, a microcontroller, memory, a battery, and an external data communication link. Sensor modules of this type are generally capable of providing the necessary information to assess the functional and qualitative state of goods and products through continuously monitoring heat, humidity, and their cumulative effects. However, sensor modules are generally costly, have limited battery lifetime, are excessive in size for many applications, and require an additional (internal or external) software layer to provide a cumulative output. The high cost of these modules, particularly at an item-level, is a major barrier to their wide use in many applications.

In view of the above, it would be desirable if an environmental sensor system and method was available that overcame limitations and shortcomings of existing environmental sensor systems.

BRIEF SUMMARY OF THE INVENTION

The present invention provides a method and system capable of providing a cumulative measurement capability that overcomes limitations of existing environmental sensing technologies and systems by using an array of low-power digital micro-electro-mechanical-system (MEMS) sensing elements that can be cost-effectively batch manufactured and packaged at wafer-level with integrated circuits. In a preferred embodiment, the invention provides a microsensor RFID tag capable of cumulatively measuring one or more environmental conditions, such as heat and humidity, for continuous monitoring of storage and shipping conditions of items in various applications, including supply-chain management of perishable goods, pharmaceuticals, chemicals, fresh agriculture products, etc.

According to a first aspect of the invention, a MEMS-based digital sensing system is provided that includes integrated circuitry and a plurality of sensing elements. Each sensing element comprises a cantilevered bimorph beam and at least one set of open contacts configured for non-latching contact-mode operation with the beam. The bimorph beam of each sensing element is responsive to an environmental condition so as to deflect toward and away from the open contacts thereof in response to changes in the environmental condition. Furthermore, the bimorph beams are configured to contact and close their respective open contacts at different levels of the environmental condition. Each sensing element produces a digital output when its bimorph beam contacts and closes its open contacts, for example, as a result of being sensed resistively, capacitively, etc. The integrated circuitry interfaces with the sensing elements so that the digital outputs of the sensing elements are processed to generate a system output of the sensing system.

In a preferred embodiment, the system output is a time-weighted output that cumulatively reflects the sensing elements whose bimorph beams have contacted their contacts over time. More preferably, the system output is cumulative and represents the time-weighted sum of the digital outputs from the highest responding sensing elements, in other words, the sum of the multiplication products of the digital outputs of the highest responding sensing elements and the contact durations of those sensing elements. Furthermore, the integrated circuitry preferably interfaces with the sensing elements such that the digital outputs of the sensing elements are not equal, but instead a sensing element that produces its digital output at a higher level of the environmental condition has a greater digital output than a second sensing element that produces its digital output at a lower level of the environmental condition. This aspect of the invention can be achieved with the use of a variable digital clock assigned to the highest responding sensing element at any given time and a counter whose output represents the cumulative measurement for the environmental condition. The preferred relationship between clock rate and the sensing element is such that the clock rate increases with increasing levels of the environmental condition. Accordingly, the cumulative system output is nonlinear relative to the environmental condition being sensed, and therefore emulates the relative damage that can be caused, for example, to a product by increasing levels of the environmental condition.

Another preferred aspect of the invention is that the digital outputs of only a subset of the sensing elements are processed by the integrated circuitry to generate the system output of the sensing system. By using only a subset of the sensing elements, the system output can be based on those sensing elements identified during fabrication of the sensing system to have desirable operation characteristics, e.g., for the particular range of environmental condition levels anticipated for the sensing system.

According to a second aspect of the invention, a digital sensing method is provided that employs integrated circuitry and a plurality of contact-mode sensing elements responsive to an environmental condition, The sensing elements are operable to close sets of open contacts at different levels of the environmental condition to individually produce digital outputs. The integrated circuitry is then used to interface with the sensing elements so that the digital outputs of the sensing elements are processed to generate a system output of the sensing system. Preferred aspects of the sensing method include the preferred operational capabilities described above for the sensing system of this invention.

According to a third aspect of the invention, a method is provided for producing a MEMS digital sensing system that operates with a only subset of a plurality of contact-mode sensing elements. The method includes fabricating integrated circuitry and the plurality of sensing elements, with the sensing elements being responsive to an environmental condition and operable to close at least one pair of open contacts at different levels of the environmental condition to individually produce digital outputs. Responses of the sensing elements to different levels of the environmental condition are determined, after which a subset is selected of the sensing elements that produce digital outputs corresponding to a predetermined range of levels of the environmental condition. The integrated circuitry is then used to process the digital outputs of only the subset of the sensing elements to generate a system output of the sensing system while a remainder of the sensing elements is ignored by the integrated circuitry when generating the system output. The subset of sensing elements are preferably selected on the basis of having desirable operation characteristics, e.g., for the particular range of environmental condition levels anticipated for the sensing system. In this manner, calibration of the sensing system is unnecessary, contrary to conventional practices associated with electronic sensors of the prior art.

In view of the above, it can be seen that the MEMS digital sensing system, sensing method, and fabrication method of this invention are well suited for implementing automated and cost-effective supply chain management by processing the digital outputs of the sensing elements to generate one or more cumulative system outputs, such as cumulative temperature and humidity outputs, and then using an RFID wireless link for transmission of these cumulative outputs to a RFID reader (interrogator). The advantages of the invention can be further realized by fabricating the sensing elements using CMOS-compatible batch fabrication process technologies. By fabricating large arrays of MEMS sensing elements and selecting only certain elements to generate the system output based on the desirable operational characteristics of the selected elements, the present invention enables post-manufacturing sensor testing to be greatly simplified by avoiding the need for post-manufacturing calibration or otherwise adjusting sensing characteristics of individual sensors that tend to deviate from targeted characteristics due to manufacturing process variations and tolerances. Finally, another advantage of the invention is the ability to employ an electronic system architecture that in conjunction with the sensing elements results in ultra-low power operation and extended battery life.

Other objects and advantages of this invention will be better appreciated from the following detailed description.

BRIEF DESCRIPTION OF THE DRAWINGS

FIG. 6 is a graph plotting the effect that the geometrical design of the sensing beam has on temperature sensitivity of the sensing element.

FIG. 7 is a perspective view of an individual humidity sensing element of the sensor array package of FIG. 2.

FIG. 8 represents the response of a sensing beam of the humidity sensing element of FIG. 7 to a change in humidity.

FIGS. 10A through 10E schematically represent the functionality of an optional power-efficient temperature compensation scheme for the humidity sensing element of FIG. 7.

DETAILED DESCRIPTION OF THE INVENTION

Figure 1:
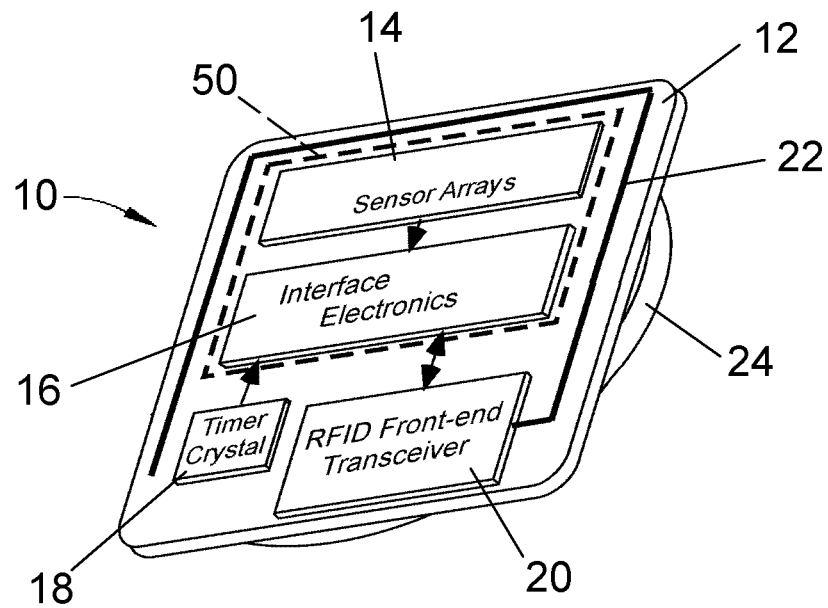
FIG. 1 schematically represents a perspective view of a microsensor RFID tag containing a sensor array package in accordance with a preferred embodiment of this invention.

FIG. 1 schematically represents a microsensor RFID tag 10 in accordance with a preferred embodiment of the invention. FIG. 1 represents components of the tag 10 as including a substrate 12 that carries one or more sensor arrays 14, interface electronics 16, a clock generator (timer crystal) 18, an RFID front-end transceiver 20, an antenna 22, and a battery 24. While the tag 10 of this invention will be discussed with particular reference to humidity and temperature sensing, those skilled in the art will appreciate that technological aspects of the tag 10 can be implemented with other types of sensors, including chemical, shock/vibration, tilt, pressure, acceleration, and biological sensors.

Figure 2:
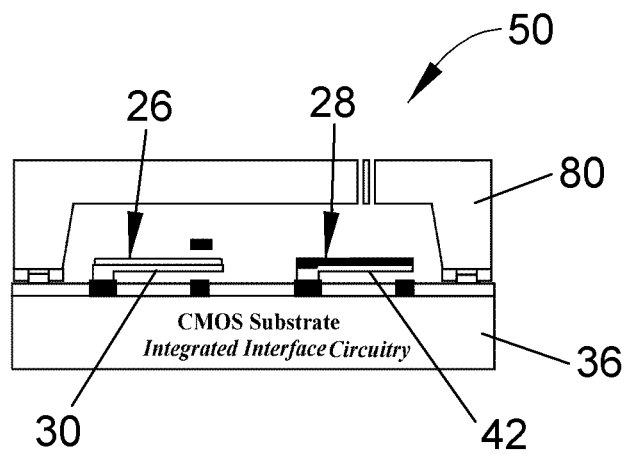
FIG. 2 represents a cross-sectional view of the sensor array package of FIG. 1.

The substrate 12 can be of any suitable construction and material, such as those currently used in RFID and/or electronics technologies, and therefore will not be discussed in any detail here. Other than as noted below, the clock generator 18, transceiver 20, antenna 22, and battery 24 can also be of known construction and design, and therefore will only be discussed to the extent necessary for those skilled in the art to understand and implement the invention. In contrast, the sensor arrays 14 and interface electronics 16 are preferably configured to provide certain advantages particular to the present invention. FIG. 2 represents a cross-sectional view of a package 50 containing the sensor arrays 14. Though not shown, the interface electronics 16 are also preferably enclosed within this package 50, as will be described with reference to FIGS. 14 to 20. Two sensing elements 26 and 28 are shown in FIG. 2, representative of two arrays 14 of sensing elements 26 and 28 within the package 50. Each element 26 and 28 is represented as having a cantilevered beam 30 and 42, respectively, which are bimorphic according to a preferred aspect of the invention. While the invention will be discussed with specific reference to the package 50 containing two arrays 14 of sensing elements 26 and 28, and the sensing elements 26 and 28 being specifically adapted to sense temperature and relative humidity, respectively, those skilled in the art will appreciate that the package 50 could contain any number of arrays of sensing elements, and the sensing elements 26 and 28 can be configured to sense other environmental conditions to which the package 50 might be subjected, including chemicals, shock/vibration, tilt, pressure, acceleration, biological agents, etc. Such capabilities can be achieved by using appropriate materials to form the bimorphic beams 30 and 42 of the sensing elements 26 and 28, as will be understood from the following discussion.

Figure 3:
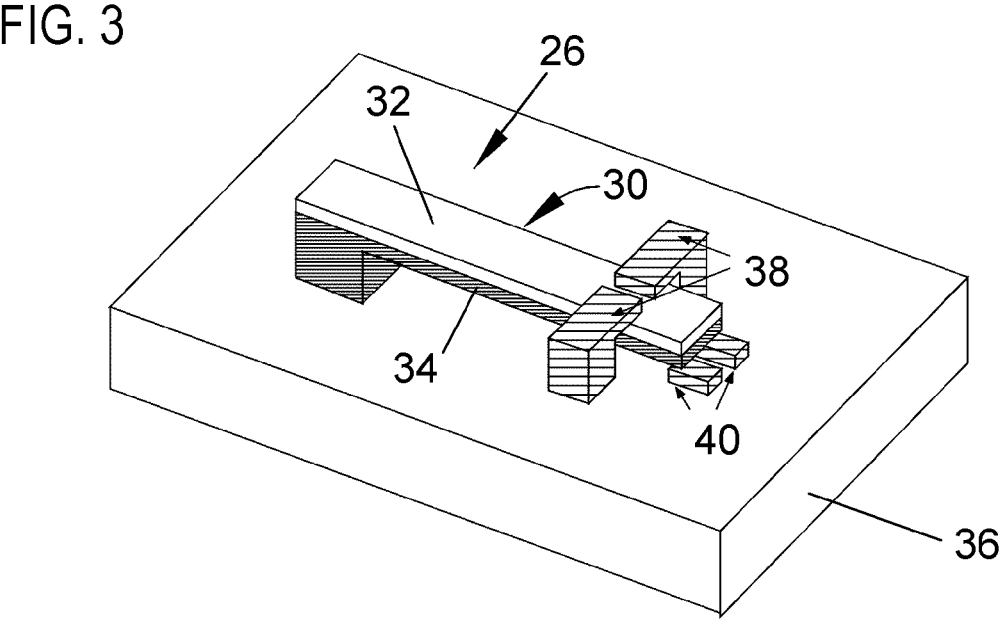
FIG. 3 is a perspective view of an individual temperature sensing element of the sensor array package of FIG. 2.
Figure 13:
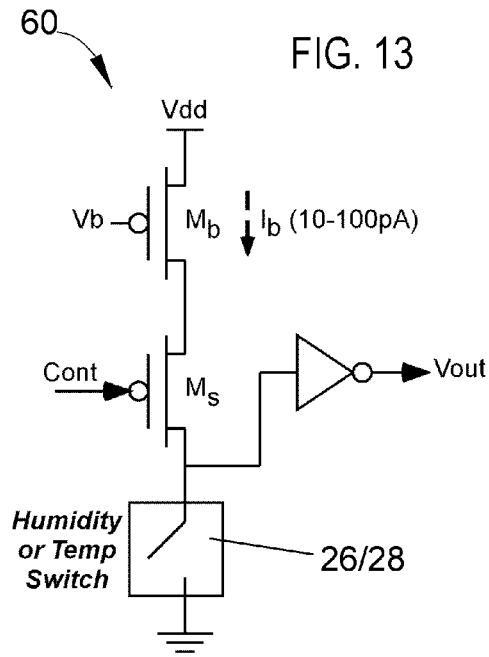
FIG. 13 schematically represents a low-power sensor read-out front-end circuit for use with the temperature and humidity sensing elements of this invention.

FIGS. 3 and 7 represent perspective views of individual temperature and humidity sensing elements 26 and 28, respectively. According to a preferred aspect of the invention, each sensing element 26 and 28 is a bimorph MEMS structure that functions as a switch in response to either the temperature or humidity of the environment surrounding the tag 10. As such, the sensing elements 26 and 28 are able to extract the energy needed for mechanical switching from the environment itself, thereby drastically reducing the power required to sense temperature and humidity. The mechanical switching operation of an array of the sensing elements 26 and 28 is inherently digital and can be converted to an electrical signal using simple compact front-end circuitry 60 (FIG. 13). In a preferred embodiment, the front-end circuitry 60 is able to make use of a minimal number of transistors and may dissipate less than one thousand picowatts per sensing element 26 and 28, resulting in a total electrical power dissipation on the order of nanowatts. As such, the sensing elements 26 and 28 of this invention are capable of operating in a manner that avoids the limitations of many existing IC-based sensors, which even if designed for lower power consumption are incompatible for continuous monitoring of temperature and humidity over a period of few years if relying on the energy capacity of existing miniature batteries. Furthermore, as will become evident from the following discussion, a preferred system architecture of the tag 10 is optimized for cumulative measurements using a simple and elegant counter-based architecture that does not require any power consuming arithmetic logic units (ALU's). In combination, these features significantly decrease the complexity of the tag 10 and its electronics to attain reductions in size, cost, and power not attainable with current commercial embodiments of environmental sensors.

With reference now to FIG. 3, the bimorph cantilevered beam 30 of an individual temperature sensing element 26 is represented as being fabricated to include two thin films 32 and 34 having different coefficients of thermal expansion (CTE). Metals such as aluminum and gold are believed to be preferred for the films 32 and 34, respectively, though it is foreseeable that other material combinations could be used, including metals and nonmetals. While the films 32 are shown as being positioned one atop the other to yield a vertical bimorph stack (vertical being normal to the surface of the substrate 36), it should be understood that the films 32 and 34 could be arranged side-by-side to yield a horizontal (lateral) bimorph stack (again, relative to the surface of the substrate 36). Furthermore, as understood by those skilled in the art, the beam 30 could include additional layers/films, such as adhesion layers to promote adhesion of the films 32 and 34 to each other, and stress compensation layers to improve the distribution of any processing-induced strain within the beam 30. As examples, if the films 32 and 34 are aluminum and gold, suitable adhesion layer materials include titanium and chromium, which in some cases may also be suitable for use as a stress compensation layer. It is also within the scope of the invention to pattern some of the layers that form the beam 30 for the purpose of modifying their properties, including response to temperature and/or other environmental conditions, electrical conductivity for use as electrical contacts, etc. As such, it should be understood that the beam 30 comprises layers of various materials that, in combination, yield a bimorphic effect One end of the beam 30 is anchored to a suitable substrate 36, preferably a conventional CMOS circuit substrate in which the interface electronics 16 is also fabricated, as discussed later. The opposite end of the beam 30 is shown as being suspended between two sets of open contact pairs 38 and 40. The beam 30 may have electrically-conductive layers (not shown) for making electrical contact with the contact pairs 38 and 40. It can be readily appreciated that the structure of the sensing element 26 is simple and compatible with post-CMOS processing, and that very large, high-density arrays of such sensing elements 26 can be fabricated in a very small area.

Figure 4:
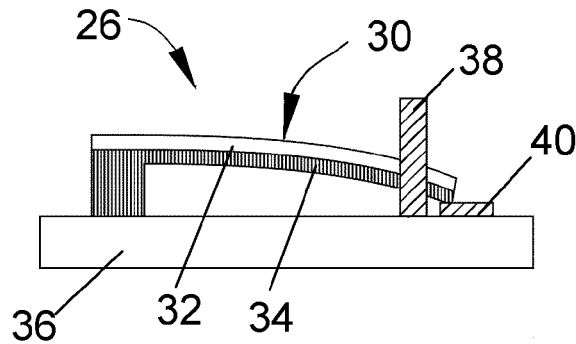
FIGS. 4 and 5 represent the response of a sensing beam of the temperature sensing element of FIG. 3 to an increase and decrease, respectively, in temperature.
Figure 5:
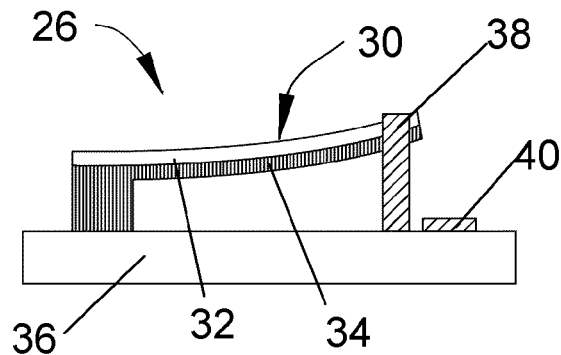

As a result of its multilayer, bimorphic construction, the cantilevered beam 30 freely deflects with temperature change due to the CTE mismatch of the films 32 and 34. FIGS. 4 and 5 illustrate an example of the sensing element 26 of FIG. 3 in which the beam 30 has a vertical bimorph stack, with its upper film 32 having a higher CTE than the lower film 34, for example, an aluminum film 32 over a gold film 34. A non-latching contact-mode switching function is provided when the portion of the beam 30 between the contact pairs 38 and 40 touches one of the pairs 38 or 40, completing an electrical circuit containing that particular pair 38 or 40. The temperature sensitivity of the cantilevered beam 30 of any given temperature sensing element 26 can be analytically obtained based on structure geometries and material properties. The tip deflection in a bimorph beam with no intrinsic stress is calculated by:

$$Y_{tip} = 3\Delta T(\alpha_2 - \alpha_1)(t_2 + t_1)L^2 / (t_2^2(4 + 6t_1/t_2 + 4(t_1/t_2)^2 + (E_1/E_2)(t_1/t_2)^3 + E_2 t_2 / E_1 t_1))$$

where $\Delta T$ is temperature change, $t_1$ and $t_2$ are the thicknesses of the films 32 and 34, $\alpha_1$ and $\alpha_2$ are the CTE's of the films 32 and 34, and E is the Young's modulus of elasticity of the films 32 and 34. Because sensitivity is independent of the beam width, the widths of the beams 30 can be minimized to reduce the size of the array to the extent that manufacturing reliability allows. FIG. 6 shows a plot of beam lengths needed to close a gap of "d" over a range of temperatures for sensing elements 26 whose beams 30 are formed by aluminum and gold films 32 and 34 (respectively) having equal thicknesses ($t_1$ and $t_2$) of either 0.5 or 1 micrometer. FIG. 6 evidences the feasibility of fabricating temperature sensing elements 26 whose beams 30 will make contact with their respective contact pairs 38 and 40 within a temperature range that encompasses temperatures typically encountered during shipping and storage. From FIG. 6, it can also be seen that a switching function at a desired temperature setpoint (threshold) can be obtained by fabricating an array of sensing elements 26 whose beams 30 are intentionally of different lengths, with longer beams 30 being more sensitive to temperature and resulting in contact with one of the sets of contact pairs 38 and 40 at progressively smaller temperature changes with increasing beam lengths. Scaling of the feature sizes of the beams 30 improves the achievable measurement resolution in addition to the die size reduction. The process patterning feature size for a given desired temperature resolution is approximately equal to the minimum slope of the beam length vs. temperature plot of FIG. 6 multiplied by the desired temperature resolution. A patterning resolution of less than one micrometer is believed to be adequate to achieve desirable operation of the tag 10, such as ten-bit resolution.

Similar to the temperature sensing elements 26, the humidity sensing elements 28 of this invention also operate on the basis of a bimorph effect, which causes deflection in its cantilevered beam 42 that can be detected by switching contacts. As represented in FIG. 7, the cantilevered beam 42 comprises a pair of thin films 44 and 46 that exhibit different humidity-induced expansion characteristics. For processing purposes, the lower film 46 is preferably formed of the same material as the upper film 32 of the temperature sensing element 26, e.g., a thin metal film that does not exhibit any appreciable humidity-induced expansion, such as aluminum or gold. In contrast, the upper film 44 of the beam 42 is formed of a material that exhibits a notable response to humidity. Certain polymer materials are well suited for the upper film 44, a particular example of which is the PI-2730 series of low-stress G-line photodefinable polyamides available from HD Microsystems. For feature sizes below about three micrometers, a more preferred material for the film 44 is believed to be a higher density low-stress I-line polyimide such as HD-8000, also available from HD Microsystems. In most cases, one open contact pair 48 is adequate for the humidity sensing elements 28, since the beams 42 only deflect in one direction (downward in FIGS. 7 and 8) due to humidity-induced expansion of the top beam film 44 (assuming the humidity sensing element 28 is fabricated in a dry (e.g., oven) environment). The contact pair 48 could be placed above the beam 42, similar to the upper contact pair 38 of FIGS. 3 through 5, if the lower film 46 within the beam 42 is made from a material more responsive to humidity than the upper film 44. In addition, it should be understood that the response of the beam 42 to humidity can be altered by completing its fabrication in an environment containing a controlled level of humidity, in which case two open contacts for each sensing element might be needed. Finally, as with the beam 30 of the temperature sensing element 26, the beam 42 of the humidity sensing element 28 can be formed of multiple layers of a variety of different materials, both metallic and metallic, including adhesion-promoting, stress-distributing layers, and electrical contact layers, as well as patterned layers for the purpose of modifying the response of the beam 42 to humidity and other environmental conditions.

In the past, MEMS humidity sensors have employed various transduction techniques including capacitive based on detecting a change in dielectric constant of a humidity sorbent polymer, resonant based on detecting a change in mass after humidity absorption, and bimorphic based on detecting a change in resonant frequency of a diaphragm or detecting bimorph strain using piezoresistors. In general, bimorphic humidity sensors operate on the basis of a sorption-induced volume expansion of a hygroscopic layer within a bimorph structure. The above-noted polyimides have coefficients of volume expansion on the order of $10^{-5}$/% RH, which is quite adequate for the sensing of humidity in accordance with this invention. It should be understood that identification of the most suitable polymer materials, film design, and optimum sensitivity are desirable, as is the ability to improve and adjust the humidity sorption of the upper film 44, such as by ion bombardment of the upper film 44 if formed of a preferred polyimide.

While bimorphic temperature and humidity sensors are known, and the bimorphic effect has been employed to make latchable MEMS temperature switches, MEMS capacitive and piezoresistive sensors, and MEMS humidity sensors in the past, the present invention applies this known technology in the form of simple contact-mode (non-latching) switches capable of being fabricated in high-density, compact arrays, preferably with the capability of being monolithically integrated with CMOS circuitry, in a manner that directly impacts system level performance parameters of power, size, and cost. For example, the substrate 36 is preferably fabricated to contain sufficiently large arrays of each sensing element 26 and 28 so that the tag 10 only requires the operational use of a fraction of each array of elements 26 and 28. As discussed in more detail below, the elements 26 and 28 chosen for use are selected to ensure proper performance of the tag 10 over a range of environmental conditions anticipated for the tag 10.

In practice, the thin films 32, 34, 44, and 46 of the beams 30 and 42 have intrinsic stresses, which cause the beams 30 and 42 to deflect at room temperature and humidity conditions, thus shifting the switching thresholds of the individual sensing elements 26 and 28. Such an effect is undesirable, particularly since controlling thin film stresses during manufacturing can be difficult. This problem can be reduced in part by minimizing stresses in the initially deposited films 32, 34, 44, and 46 through the proper choice of materials. Aluminum and gold are very good candidates for the films 32, 34, and 46 for this reason. If deposited by sputtering, the intrinsic stresses of metal layers (e.g., films 32, 34, and 46) can be further minimized by optimizing the deposition pressure and bias conditions. A post process temperature annealing step can also be performed to relieve intrinsic stresses to some extent, and helps to preclude sensor drift due to long term stress relaxation.

Figure 9:
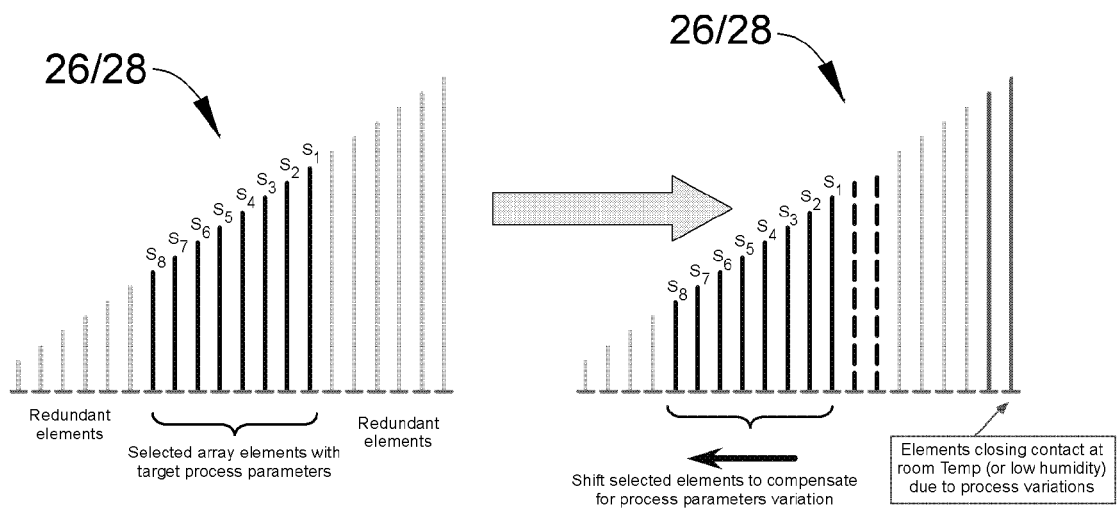
FIG. 9 schematically represents two arrays of sensing beams with different sets of beams being selected for utilization in different sensor array packages in accordance with a fabrication yield-enhancement technique of this invention.

Because arrays containing in excess of a hundred to thousands of sensing elements 26 and 28 can be readily fabricated using MEMS technology, the sensing approach of this invention enables the tag 10 to have a large redundancy of sensing elements 26 and 28 that enhances yield without any noticeable cost penalty. Therefore, according to a preferred aspect of the invention, significant yield enhancements can be achieved fabricating the sensing elements 26 and 28 in sufficiently large arrays, and then selecting only a subset of elements 26 and 28 from each array for actual use by the tag 10 to perform the temperature and humidity sensing functions. Such an approach is represented in FIG. 9, in which eight of twenty sensing elements (26 or 28) are represented as being selected on the basis of having suitable operating characteristics within a targeted range of the particular environmental condition of interest, e.g., temperature or humidity. While the selection of eight of twenty elements 26/28 is represented in FIG. 9, it should be understood that the number selected and the size of the array are not limited by this example, and that performance improves as the numbers of sensing elements 26 and 28 are increased in each array. The lefthand side of FIG. 9 represents a situation in which controlled processing has resulted in intrinsic stresses such that the as-fabricated elements 26/28 of the array have acceptable operating characteristics. The elements S1-S8 would be suitable as the operational switches for the sensor arrays 14 if the stresses remain within expected levels, and redundancy is obtained because a larger number of elements 26/28 are present that cover a wider range and provide higher resolution of the environmental condition than what is required by the sensor application.

After further manufacturing and performing an optional annealing, the deflection of some of the elements 26/28 may be more or less than expected as a result of manufacturing variations, including geometry, surface characteristics, process-induced stress variations, etc., resulting in switching at lower or higher thresholds (e.g., room temperature or low humidity). The states of these elements 26/28 can be detected by a single readout during initial testing. The stress variations and post-fabrication thresholds of the elements 26/28 within their respective arrays can then be determined based on the final state of the elements 26/28, followed by a digital reassignment (selection) of the elements 26/28 that will be operational within the tag 10. In this manner, a certain subset of each array of elements 26 and 28 can be selected to correct for any shifts in operational characteristics, including those attributable to stress and manufacturing variations. In a preferred embodiment, in which by geometrical design the elements 26/28 are arranged in their arrays so that their thresholds differ linearly along the length of the array, the general effect of stress and manufacturing variations will appear as an offset. Therefore the array reassignment is a shift operation, in which a single block of adjacent (side-by-side) elements 26/28 is selected, minimizing the complexity of the control logic circuitry necessary to perform this operation and relaxing the on-chip non-volatile memory requirements of the tag 10.

The approach to sensor fabrication described above significantly differs from conventional sensor manufacturing approaches in which tolerances of the manufacturing processes are tightened and post fabrication calibration is employed to perfect the characteristics of individual sensors, for example, by physically modifying and/or electronically compensating a sensor to alter its response or output relative to the parameter being sensed. It is important to note that the sensor fabrication and sensing scheme of this invention is made technically and economically practical by the use of relatively low-cost but fully-integrated MEMS sensing elements 30 and 42, by which cost effectiveness is promoted by the presence of redundant sense elements 30 and 42 that exhibit a range of sensitivities to the environmental condition(s) of interest.

As known in the art, a significant issue concerning humidity sensors is their temperature sensitivity. In the past, this sensitivity has been electronically compensated using analog or DSP approaches, each of which, in terms of power requirements, is very demanding. Depending on the materials used, the humidity sensing elements 28 of this invention may also exhibit a temperature sensitivity due to the CTE mismatch of the films 44 and 46. The overall effect of CTE mismatch has been investigated through FEM simulations, which have shown that higher temperatures correspond to reduced humidity sensitivity, i.e., switching at higher humidity levels than intended. However, it is believed that suitable materials for the films 44 and 46 of the beam 42, such as the preferred gold, polyamide, and polyimide materials, can be chosen to avoid the need for temperature compensation in many applications. As an optional aspect of this invention, FEM simulations have been employed to show that by properly designing the length of a humidity sensing beam 42, the deflection at a given relative humidity percent (RH %) can be maintained the same regardless of temperature variations using a power-efficient temperature compensation scheme shown in FIGS. 10A through 10E.

Figure 10A:
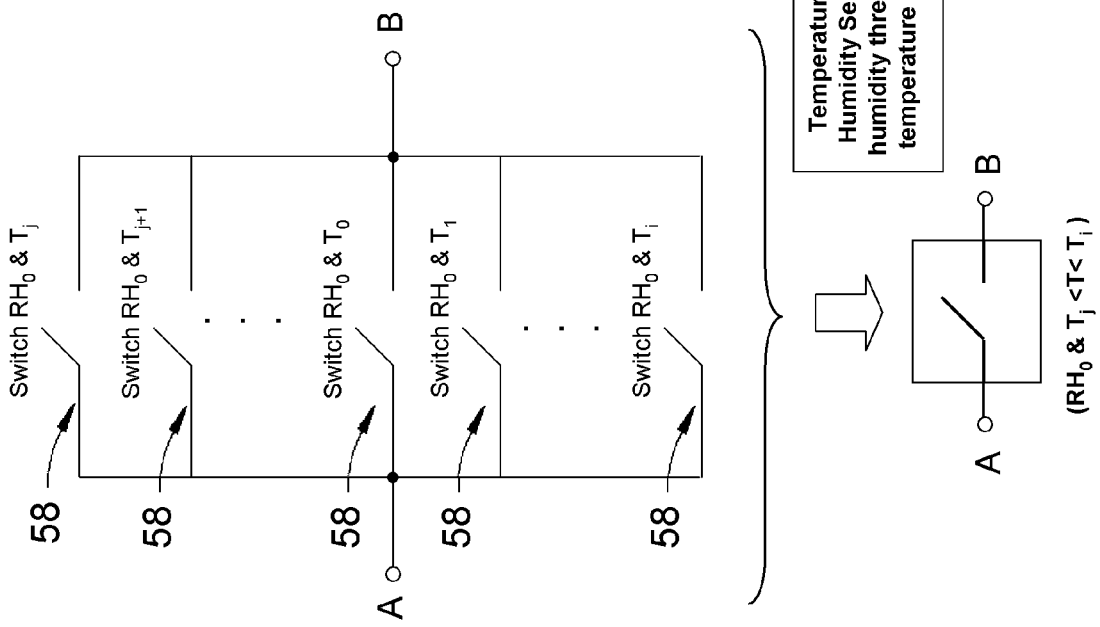

The represented temperature compensation scheme is based on the use of multiple contact-mode humidity switching elements 58 in parallel to form an effective contact-mode humidity switch 59 with a humidity threshold ($RH_0$) over a temperature range of $T_j$ (a temperature below a nominal or room temperature) to $T_i$ (a temperature above a nominal or room temperature), as shown in FIG. 10A. Each parallel switching element 58 in FIG. 10A includes a bimorphic contact-mode humidity sensing element (e.g., of the type shown in FIGS. 7 and 8) and a bimorphic contact-mode temperature sensing element (e.g., of the type shown in FIGS. 3 through 5). The humidity and temperature sensing elements are designed and put together in series or shunt configuration such that they provide an effective contact at a humidity level of $RH_0$ and temperature of $T_n$, where $T_j < T_n < T_i$. The lengths of the bimorphic beams (e.g., 42) of the humidity sensing elements are sized to compensate for the changes in humidity level at which they contact their open contacts (e.g., 48) due to temperature. For example, FIG. 10B shows a case where the CTE of the upper film 44 of a beam 42 is lower than the CTE of the lower film 46 of the beam 42, resulting in decreased sensitivity as the temperature increases if beam length is maintained constant. The humidity switch level at higher temperatures can be maintained constant if the beam length is increased. Again, in FIG. 10B, the beam length of a humidity sensing element 28 is increased to maintain the switch level of $RH_0$ at a higher temperature $T_n$. The temperature sensing element 28 is added in series to ensure that the contact of the humidity switch 28 is only detected by the system integrated circuitry 16 when the temperature exceeds $T_n$, so that a false humidity switch contact at lower humidity levels (lower than $RH_0$) occurring at lower temperatures (lower than $T_n$) will not be observed by the circuitry 16. The temperature sensing element 26 in FIG. 10B is a "hot" contact where a contact is made when temperature goes above the nominal temperature (e.g., as shown in FIG. 4). Also, it should be noted, that the described temperature compensation is designed such that it is consistent with the preferred operation of the system interface electronics 16 in which, as discussed later, the digital output of a sensing element resulting from contact caused by the highest sensed environmental condition (e.g. humidity) is processed in lieu of the remaining elements at any given instant of time.

FIG. 10C represents a temperature-compensated humidity sensing element 28 with the same bimorphic film arrangement as FIG. 10B, but for temperatures below a nominal (room) temperature. In this case, the beam length of the humidity sensing element 28 is reduced to maintain the switching level at $RH_0$ at lower temperatures. In this case, there is no need for a temperature sensing element in series with the humidity sensing element 28. However, a shunt temperature sensing element 26 configured to switch at relatively cold temperatures (e.g., temperatures lower than nominal, such as the case shown in FIG. 5) is added. When closed, the temperature sensing element 26 nulls the effect of a closed humidity sensing element 28. This is obtained by making electrical connections at nodes A, B, C to appropriate voltages and elements, as represented in FIG. 10C with reference to a preferred front-end circuit 60 shown in FIG. 13. The role of the shunting temperature sensing element 26 is to ensure that if the temperature is reduced below $T_n$, the effective contact between points A and B (which is defined as a contact detected by the front-end circuit 60) remains open and, similar to the case shown in FIG. 10B, an incorrect detection of the humidity sensing element 28 switching at combined lower humidity levels and lower temperature levels is avoided.

Figure 10D:
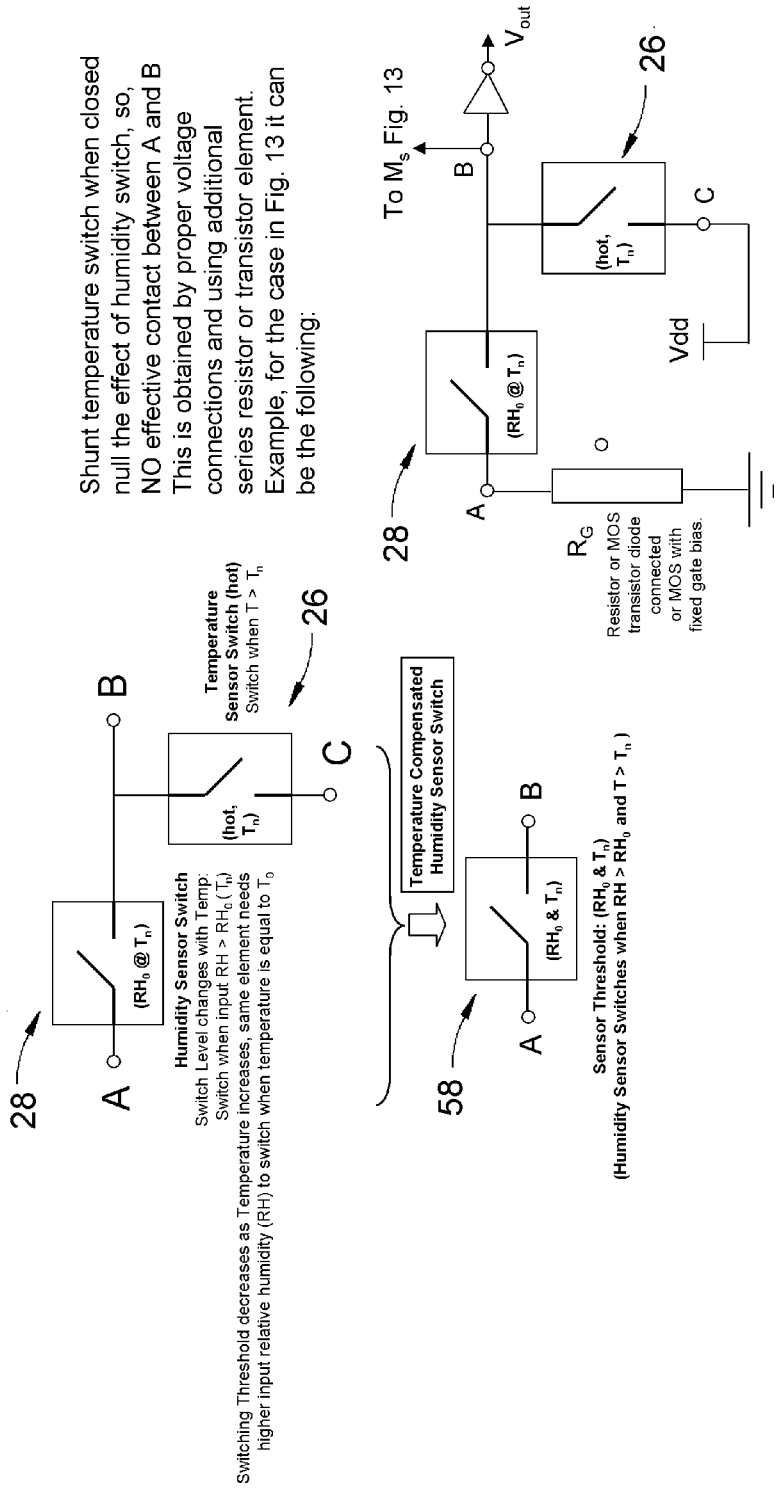

FIGS. 10D and 10E show similar temperature compensation for the case in which the CTE of the upper film 44 is greater than that of the lower film 46 of the beam 42, and therefore the inverse of the case shown in FIGS. 10B and 10C. A shunt temperature sensing element 26 is used when the temperature increases (FIG. 10D) and a series temperature sensing element 26 is used when the temperature decreases (FIG. 10E).

Figure 11:
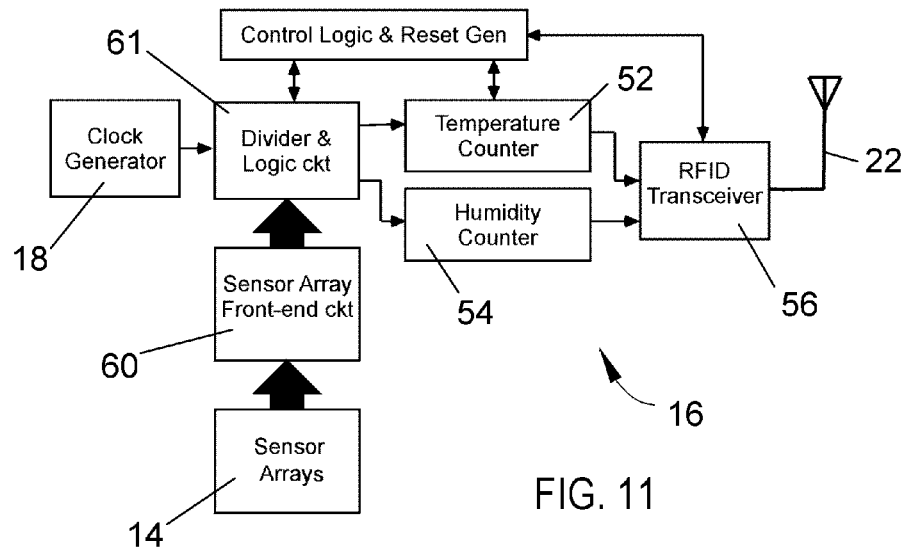
FIG. 11 is a simplified block diagram of the interface electronics of the microsensor RFID tag of FIG. 1.

FIG. 11 is a simplified block diagram of suitable system integrated circuitry for the interface electronics 16 of FIG. 1. In addition to providing the desired cumulative heat and moisture sensing capability by interfacing with the sensor arrays 14, the interface electronics 16 also preferably controls the power dissipation and operation life of the tag 10. In order to fully benefit from the high-density array of sensing elements 26 and 28 of the sensor arrays 14, the interface electronics 16 is preferably ultra-low power, compact and uncomplicated, employs the front-end circuitry 60 to detect the mechanical switching of the elements 26 and 28, such as resistively or capacitively, and then employs a divider and logic circuit 61 to convert such switching to an electrical cumulative digital signal. The interface electronics 16 is shown as having counters 52 and 54 for heat and humidity measurements, respectively. The output of the counters 52 and 54 is represented as being transmitted with a RFID transceiver 56 and the antenna 22, which form a passive RFID link to an external reader/interrogator (not shown). Alternatively, an active RFID link could be employed without a significant impact on the life of the tag 10 provided that a low bit rate and small duty-cycle transmission is performed.

Figure 12:
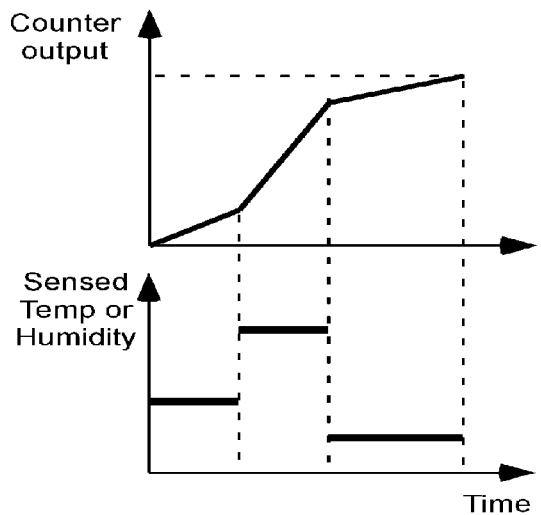
FIG. 12 is a pair of graphs that show the output of a counter with controlled clock speed used to indicate the cumulative temperature or humidity measurements to provide an efficient IC implementation of the microsensor RFID tag of this invention.

In FIG. 11, power saving is accomplished with the interface electronics 16 by using an efficient counter-based implementation for cumulative sense exposure parameter measurements without any need for a complex Arithmetic Logic Unit (ALU) or microprocessor. In the preferred embodiment, the temperature and humidity counters 52 and 54 calculate cumulative measurements as the weighted integral of the sensed environmental condition over time. In a discrete digital implementation, this is equivalent to output of a real-time clock counter multiplied by the sensed parameter amplitude. The product of this multiplication operation determines the slope of the final output of the counters 52 and 54. Provided that a higher clock speed signal is available to the electronics 16 from the clock generator 18, which is brought down to the real-time clock by the divider and logic circuit 61, the same function can be implemented by controlling the dividing factor without any need for a multiplier. Such an operation is shown in FIG. 12, where the output of one of the counters 52 or 54 with controlled clock speed is shown as directly providing the cumulative heat or humidity output. In a preferred implementation of this approach, the clock speed corresponding to each sensing element 26/28 is higher for elements 26/28 having higher thresholds to the environmental condition they sense. Using the temperature sensing elements 26 as an example, the clock speed is incrementally faster to each element 26 in relation to the threshold temperature of that element 26. This relationship is preferably not proportional, but instead nonlinear, though it is foreseeable that a proportional relationship could be used. The advantage is that the cumulative system output resulting from adding (integrating) the individual digital outputs of all operational sensing elements 26 will emulate the relative damage that can occur as a result of increasingly excessive environmental conditions such as temperature and humidity. While this approach is uncomplicated, it provides a control implementation that is both area and power efficient. The output of the sensor arrays 14 is processed digitally and provides the control for the dividing factor. The clock generator 18 is preferably crystal-based and dissipates a few micro amps continuously. An example of a suitable clock generator 18 is existing single-chip low-power clock generators used in wristwatches. Alternatively, multiple clock generators could be used to minimize the number (or avoid the use) of real-time clock divider/counters needed for the cumulative measurements desired by this invention.

An important feature for achieving the desired ultra-low power dissipation and array circuitry compactness is the sensor array front-end circuitry 60. FIG. 13 represents a design for this circuitry 60 that employs only five transistors. $M_b$ is biased in the sub-threshold regime to set the current $I_b$ at a suitable level, such as not more than 1000 pA. Such a low current guarantees low-power dissipation and also reduces the risk of damage to the sensing elements 26 and 28 attributable to micro-fusing, which could be potentially caused by large currents. The mechanical switching of the elements 26 and 28 pulls the output inverter input low and results in a high signal. $M_s$ is added to cut the current path of the lower range elements 26 and 28 when higher temperatures or humidity levels are present and the corresponding sensing elements 26 and 28 are activated.

Figure 14:
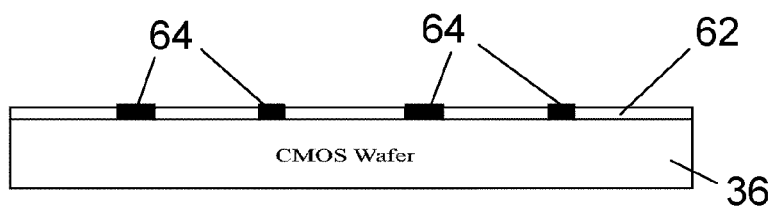
FIGS. 14 through 20 represent steps of a post-CMOS integrated sensor fabrication process by which arrays of sensing elements can be fabricated on the same substrate as the interface electronics.
Figure 15:
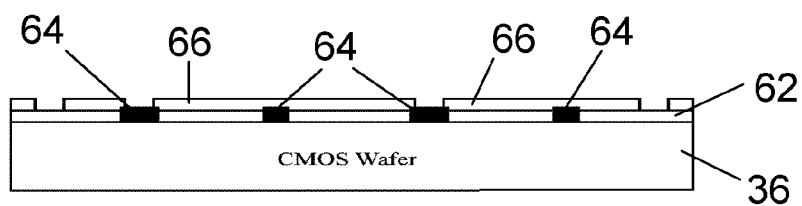
Figure 16:
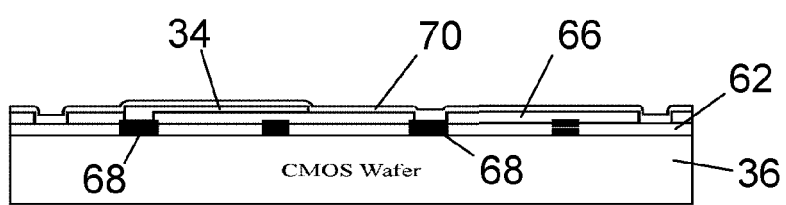
Figure 17:
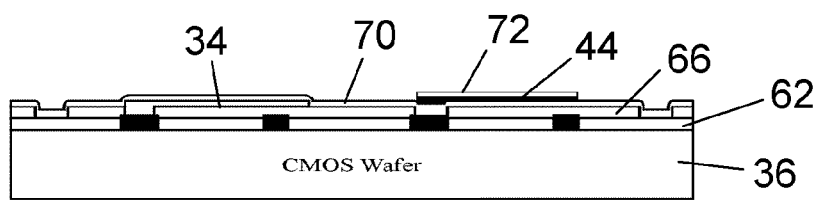
Figure 18:
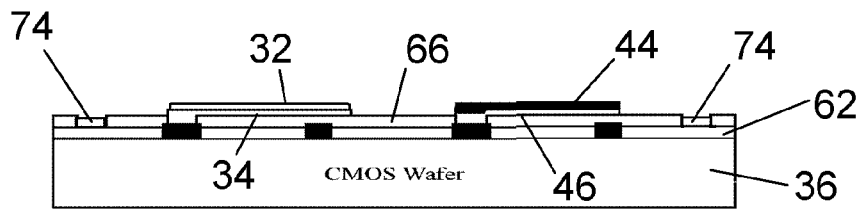
Figure 19:
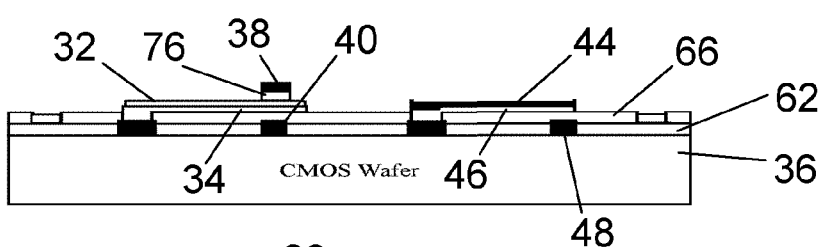
Figure 20:
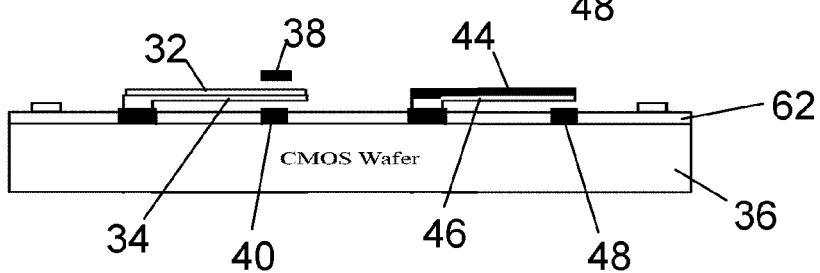

The arrays of temperature and humidity sensing elements 26 and 28 of the sensor arrays 14 are preferably monolithically integrated with the CMOS-based interface electronics 16 by fabricating the sensing elements 26 and 28 and the electronics 16 on the same CMOS wafer substrate 36, as evident from FIG. 2. Thus, in the preferred embodiment all fabrication steps for the sensing elements 26 and 28 are preferably compatible with post-CMOS processing. In addition, the fabrication process is preferably high-yield and compatible with standard semiconductor and MEMS manufacturing tools. FIGS. 14 through 20 represent a suitable fabrication process, which is shown in FIG. 14 as starting with a dry etch (e.g., reactive ion etch) of a dielectric layer 62 on the substrate 36 to expose top metal. This step is overetched slightly (for example, less than 1000 Angstroms) to form contact & anchor metal stands 64. A sacrificial layer 66, such as a photoresist or organic material, is then spun, baked, and patterned to define anchor regions 68 for the sensing elements 26 or 28, as shown in FIG. 15. The lower film 34 of the temperature sensing elements 26 (for example, aluminum or gold) is then deposited and patterned, followed by deposition of a layer 70 (FIG. 16) that when patterned will form the upper film 32 of the temperature sensing elements 26 and the lower film 46 of the humidity sensing elements 28. This common layer 70 (for example, aluminum or gold, depending on the material of the lower film 34) can be deposited by sputtering, and seals and protects the sacrificial layer 66 from subsequent polymer etches. FIG. 17 represents the result of depositing, baking, and patterning the upper film 44 (for example, polyimide) of the humidity sensing elements 28, followed by the deposition and pattering of a thin protective layer 72 on the upper film 44, such as sputtered silicon, dielectric deposited by plasma-enhanced chemical vapor deposition (PECVD), or a metal layer. The common layer 70 is then patterned and etched to define the upper films 32 of the temperature sensing elements 26 and the lower films 46 of the humidity sensing elements 28. FIG. 18 shows the completion of the preceding steps, as well as the forming of a bonding ring 74 that will be employed in the final package encapsulation process. In FIG. 19, a photo-resist has been deposited and patterned to form a sacrificial layer 76 on which metal has been deposited and patterned to form the top contact pairs 38 for the temperature sensing elements 26. Finally, the beams 30 and 42 are released by etching the sacrificial layers 66 and 76, along with removal of the protective layer 72 by dry etching.

In should be again noted at this point that, in addition to the materials noted above, the bimorph beams 30 and 42 can be fabricated from various metal and nonmetal materials deposited at suitable temperatures (preferably less than 400° C.). Suitable materials include those used in semiconductor and MEMS processing, and are therefore known to those skilled in the art. Examples include various dielectric layers, different forms of silicon, and other deposited semiconductor layers. In addition, suitable sacrificial layers used in the process described above can be formed with thin-film low temperature deposited metals, dielectric layers, different forms of silicon, and/or other deposited semiconductor materials. Accordingly, those skilled in the art can determine various suitable combinations of sacrificial and structural layers such that a bimorph beam can be fabricated to have a desired bimorph response to temperature, humidity, or another environmental condition of interest. It should be appreciated that, as with other known MEMS processes, a key factor in determining the compatibility of sacrificial and structural layers during fabrication is the ability to remove the sacrificial layers without attacking or damaging the bimorph structural layers. The selection of sacrificial layers that can be removed by a dry etch process is also desirable to minimize stiction of the beams 30 and 42 during fabrication.

Packaging of the sensor tag 10 is necessary to permit the use of the tag 10 in applications where a robust sensor is desired. Suitable packaging approaches are preferably compatible with the standard semiconductor and electronic packaging procedures and equipment. In FIGS. 21 through 24, a packaging scheme is represented that provides for protective packaging and encapsulation of the arrays of sensing elements 26 and 28, along with the interface electronics 16, at wafer level to form the sensor-circuit package 50 of FIG. 2. This scheme is a low-cost batch process after which the encapsulated integrated sensor array package 50 can be integrated into the tag 10 similar to an IC chip. The final packaging scheme also encompasses packaging of the sensor-circuit package 50 with the clock generator 18 (or another suitable timing component), antenna 22, and battery 24. While wafer level capping and packaging are often performed using glass frit bonding, packaging costs can be further reduced by using an alternative approach that minimizes the size of the sealing ring (which is several hundred micrometers in width in the case of glass frit bonding). Because the leads to the exterior of the sensor-circuit package 50 can be provided by CMOS metal layers that are buried under a planarized chemically mechanically polished (CMP) CMOS dielectric layer, the packaging lead transfer requirements for the package 50 are relaxed to a great extent.

Figure 21:
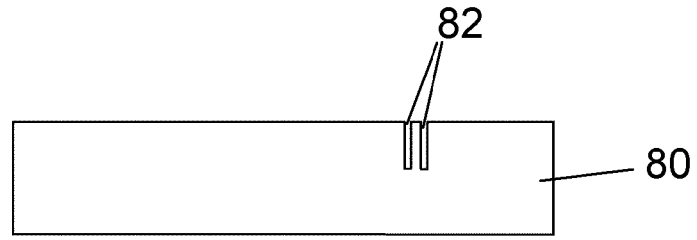
FIGS. 21 through 24 represent steps of a wafer-level packaging process by which arrays of sensing elements and the interface electronics can be packaged.
Figure 22:
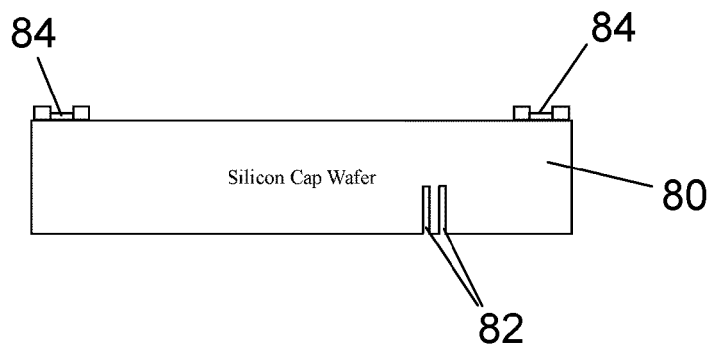
Figure 23:
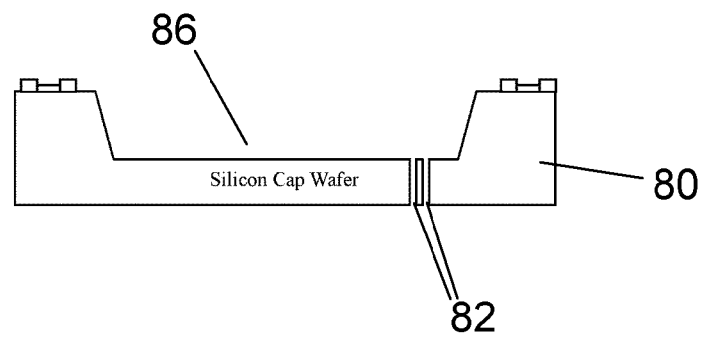
Figure 24:
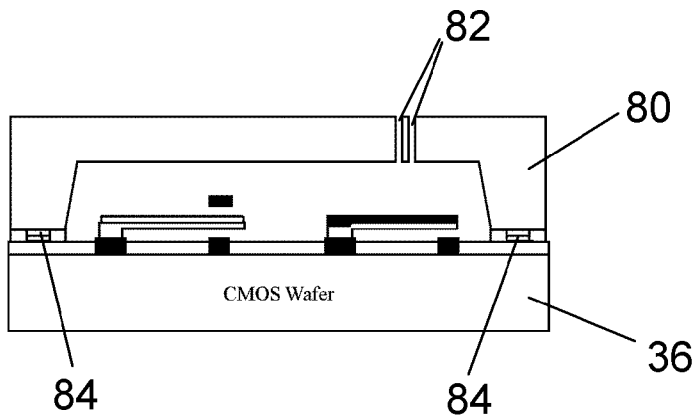

FIGS. 21 through 24 depict the primary fabrication processing steps of the sensor-circuit package 50. In FIG. 21, environment access holes 82 are patterned and etched from the frontside of a capping wafer 80 to eventually provide access to the environment as required by the humidity sensing elements 28. FIG. 22 shows the result of forming a solder area 84 by depositing and patterning an optional solder mold and thin film solder on the backside of the capping wafer 80 for the purpose of bonding the wafer 80 to the sensor-circuit substrate 36. The solder area 84 is then protected (not shown) and a recess 86 is etched in the backside of the capping wafer 80. The recess 86 can be formed by either a wet or dry etch process. If a deep dry silicon etch is performed, the walls of the recess 86 will be nearly vertical, as opposed to the sloping walls shown in FIG. 23. Finally, the capping wafer 80 is placed and aligned on the sensor-circuit substrate 36, and solder bonding is performed. It should be understood that alternative bonding techniques besides solder bonding could be used, including glass frit, eutectic bonding, thermo-compression bonding, Transient Liquid Phase (TLP) bonding, or other alloy formation bonds.

From the foregoing, it can be appreciated that the present invention provides a sensor tag 10 whose advantages include an array of ultra-low power MEMS humidity and temperature sensing elements 26 and 28 capable of very low total power dissipation and direct digital output. Each array of sensing elements 26 and 28 directly converts either thermal energy or environment moisture sorption to a mechanical motion using a bimorph structure, without the need for any power other than a low-power digital front-end circuitry 60 that dissipates the power of the sensing elements 26 and 28 and converts their switching outputs to a digital electrical output. This direct digital output, which provides a cumulative measurement capability using counters, precludes any need for power demanding analog-to-digital conversion circuitry or an ALU. If desired or necessary, humidity sensor temperature compensation can also be achieved with an optional ultra low-power scheme that uses the series combination of humidity and temperature sensing elements 26 and 28.

As also evident from the above, a batch process can be used to provide direct post-CMOS fabrication, integration and wafer-level packaging of arrays of the sensing elements 26 and 28 with the system interface electronics 16 to further minimize cost and size, and also enable the formation of cost-effective large arrays of sensing elements 26 and 28 without any concern for the need of a large number of interconnects to the interface electronics 16. Suitable processing steps are fully compatible with standard semiconductor manufacturing tools and CMOS backend processing.

Finally, the present invention provides for considerable yield enhancement for low-cost sensor fabrication through the use of very large arrays of the compact sensing elements 26 and 28 and front-end circuitry 60, and selecting a subset of each array of elements 26 and 28 on the basis of desired operating parameters ascertainable by a cost-effective, high-throughput post-manufacturing test. As such, the present invention avoids conventional sensor manufacturing where the tolerance of the manufacturing processes are tightened and post fabrication calibration are employed to perfect the operating parameters of individual sensors. This approach is enabled by the low-cost miniature fully-integrated sensor structure of this invention that makes the inclusion of redundant sensing elements in a sensor array cost effective.

While the invention has been described in terms of a preferred embodiment, it is apparent that other forms could be adopted by one skilled in the art. Therefore, the scope of the invention is to be limited only by the following claims.

The invention claimed is:

1. A micro-electro-mechanical digital sensing system comprising:
    a plurality of sensing elements on a substrate, each sensing element comprising a cantilevered bimorph beam and at least one set of open contacts configured for non-latching contact-mode operation with the bimorph beam, the bimorph beam of each sensing element being responsive to changes in an environmental condition so as to deflect toward and away from the open contacts thereof in response to the changes in the environmental condition, the bimorph beams being configured to contact and close their respective open contacts at different levels of the environmental condition; and an integrated circuitry interfacing with the sensing elements so that digital outputs of the sensing elements are processed to generate a system output of the sensing system, wherein the integrated circuitry communicates with a subset of the sensing elements that are responsive to a targeted range of the different levels of the environmental condition so that each of the sensing elements of the subset individually produces a digital output when the bimorph beam thereof contacts and closes the open contacts thereof, the digital outputs of only the subset of sensing elements are processed by the integrated circuitry to generate the system output of the sensing system, other of the sensing elements that are not part of the subset of sensing elements are responsive to the different levels of the environmental condition outside the targeted range of the different levels of the environmental condition to which the subset of sensing elements are responsive, and contact and closing of the open contacts of the other of the sensing elements by the bimorph beams thereof at the different levels of the environmental condition outside the targeted range are ignored by the integrated circuitry when generating the system output.

2. The micro-electro-mechanical digital sensing system according to claim 1, wherein the environmental condition to which the sensing elements are responsive is at least one environmental condition chosen from the group consisting of temperature, relative humidity, chemicals, shock/vibration, tilt, pressure, acceleration, and biological agents.

3. The micro-electro-mechanical digital sensing system according to claim 1, wherein at least some of the sensing elements are fabricated to be responsive to temperature and at least some of the sensing elements are fabricated to be responsive to relative humidity.

4. The micro-electro-mechanical digital sensing system according to claim 1, wherein the integrated circuitry generates the system output as a time-weighted cumulative output generated on the basis of the digital outputs of the subset of the sensing elements over time.

5. A method of sensing an environmental condition, the method comprising the steps of:
providing a sensing system comprising integrated circuitry and a plurality of contact-mode sensing elements, the sensing elements being responsive to the environmental condition and being operable to close a plurality of pairs of open contacts at different levels of the environmental condition; and
interfacing the sensing elements with the integrated circuitry so that digital outputs of the sensing elements are processed to generate a system output of the sensing system, wherein a subset of the sensing elements are responsive to a targeted range of the different levels of the environmental condition so that each of the sensing elements of the subset individually produces a digital output as a result of contacting and closing the open contacts thereof, other of the sensing elements are not part of the subset of sensing elements, the digital outputs of only the subset of the sensing elements are processed by the integrated circuitry to generate the system output of the sensing system, and contact and closing of the open contacts of the other of the sensing elements at the different levels of the environmental condition are ignored by the integrated circuitry when generating the system output.

6. The method according to claim 5, wherein the other of the sensing elements are responsive to the different levels of the environmental condition that are outside the targeted range defined by the different levels of the environmental condition to which the subset of sensing elements are responsive, and the contact and closing of the open contacts of the other of the sensing elements at the different levels of the environmental condition outside the targeted range are ignored by the integrated circuitry when generating the system output.

7. The method according to claim 5, wherein the environmental condition to which the sensing elements are responsive is at least one environmental condition chosen from the group consisting of temperature, relative humidity, chemicals, shock/vibration, tilt, pressure, acceleration, and biological agents.

8. The method according to claim 5, wherein at least some of the sensing elements are fabricated to be responsive to temperature and at least some of the sensing elements are fabricated to be responsive to relative humidity.

9. The method according to claim 5, wherein the integrated circuitry generates the system output as a time-weighted cumulative output generated on the basis of the digital outputs of the subset of the sensing elements over time.

10. The method according to claim 5, wherein each of the sensing elements comprises a cantilevered bimorph beam that is responsive to changes in the environmental condition so as to deflect toward and away from the open contacts thereof in response to the changes in the environmental condition and so as to contact and close the open contacts thereof at one of the different levels of the environmental condition.

11. A method of producing a micro-electro-mechanical digital sensing system, the method comprising the steps of:
fabricating a sensing system comprising integrated circuitry and a plurality of contact-mode sensing elements, the sensing elements being responsive to an environmental condition and operable to close at least one pair of open contacts at different levels of the environmental condition, the different levels of the environmental condition to which the sensing elements are responsive defining a wider range than a predetermined range of the different levels of the environmental condition for the sensing system;
determining responses of the sensing elements to the different levels of the environmental condition;
selecting a subset of the sensing elements that are responsive to the different levels of the environmental condition within the predetermined range of the different levels of the environmental condition so that each of the sensing elements of the subset individually produces a digital output as a result of contacting and closing the open contacts thereof, other of the sensing elements are not part of the subset of sensing elements; and then
configuring the integrated circuitry to monitor and process the digital outputs of only the subset of the sensing elements with the integrated circuitry to generate a system output of the sensing system while contact and closing of the open contacts of the other of the sensing elements at the different levels of the environmental condition are ignored by the integrated circuitry when generating the system output.

12. The method according to claim 11, wherein the environmental condition to which the sensing elements are responsive is at least one environmental condition chosen from the group consisting of temperature, relative humidity, chemicals, shock/vibration, tilt, pressure, acceleration, and biological agents.

13. The method according to claim 11, wherein at least some of the sensing elements are fabricated to be responsive to temperature and at least some of the sensing elements are fabricated to be responsive to relative humidity.

14. The method according to claim 11, wherein the integrated circuitry generates the system output as a time-weighted cumulative output generated on the basis of the digital outputs of the subset of the sensing elements over time.

15. The method according to claim 11, wherein the other of the sensing elements are responsive to the different levels of the environmental condition that are outside the predetermined range defined by the different levels of the environmental condition to which the subset of sensing elements are responsive, and the contact and closing of the open contacts of the other of the sensing elements at the different levels of the environmental condition outside the predetermined range are ignored by the integrated circuitry when generating the system output.

16. The method according to claim 11, wherein the sensing system is produced without individually calibrating the sensing elements.

17. The method according to claim 11, wherein each of the sensing elements comprises a cantilevered bimorph beam that is responsive to changes in the environmental condition so as to deflect toward and away from the open contacts thereof in response to the changes in the environmental condition and so as to contact and close the open contacts thereof at one of the different levels of the environmental condition.

* * * * *